United States Patent
Preisinger et al.

(10) Patent No.: US 9,079,317 B2
(45) Date of Patent: Jul. 14, 2015

(54) METHOD OF OPERATING A MOBILE HAND-OPERATED DEVICE FOR OUTPUTTING OR ENABLING POTENTIALLY DANGEROUS CONTROL COMMANDS AND CORRESPONDING HAND-OPERATED DEVICE

(75) Inventors: Gernot Preisinger, Linz (AT); Manfred Schininger, Linz (AT); Clemens Woeger, St. Florian (AT); Alois Zeininger, Wilhering (AT)

(73) Assignee: KEBA AG, Linz (AT)

( * ) Notice: Subject to any disclaimer, the term of this patent is extended or adjusted under 35 U.S.C. 154(b) by 344 days.

(21) Appl. No.: 12/737,500

(22) PCT Filed: Jul. 15, 2009

(86) PCT No.: PCT/AT2009/000276
§ 371 (c)(1),
(2), (4) Date: Feb. 7, 2011

(87) PCT Pub. No.: WO2010/009488
PCT Pub. Date: Jan. 28, 2010

(65) Prior Publication Data
US 2011/0160910 A1 Jun. 30, 2011

(30) Foreign Application Priority Data
Jul. 21, 2008 (AT) .................................. A 400/2008

(51) Int. Cl.
*B25J 13/06* (2006.01)
*B25J 19/06* (2006.01)
(Continued)

(52) U.S. Cl.
CPC .................. *B25J 13/06* (2013.01); *B25J 19/06* (2013.01); *G05B 9/02* (2013.01); *G05B 2219/39447* (2013.01); *H01H 3/022* (2013.01); *H01H 9/0214* (2013.01)

(58) Field of Classification Search
CPC ..................... B25J 9/1674; G05B 2219/39447; G05B 2219/40218; G05B 2219/13093; G05B 2219/50198; G05B 19/0428; H01H 3/022; H01H 9/20; H01H 71/04; H01H 83/04; B66B 1/24; B66B 1/52; B66B 5/021; B66B 5/022
USPC ........ 700/17, 245, 264; 200/19, 52, 330, 334, 200/341, 434, 435, 509; 901/1–3
See application file for complete search history.

(56) References Cited

U.S. PATENT DOCUMENTS
4,758,801 A 7/1988 Draxelmayr
5,321,311 A * 6/1994 Umemura et al. ............ 307/117
(Continued)

FOREIGN PATENT DOCUMENTS
AT 408 325 10/2001
CN 1061671 A 6/1992
(Continued)

OTHER PUBLICATIONS
Ryo et al., Three-position switch, http://www.google.com/patents/EP0702384A1?cl=en, Mar. 17, 1994.*
(Continued)

*Primary Examiner* — Darrin Dunn
(74) *Attorney, Agent, or Firm* — Collard & Roe, P.C.

(57) ABSTRACT

The invention relates to a method of operating a mobile hand-operated device (9) provided as a means of outputting or enabling potentially dangerous control commands to a controllable technical device (1) actively connected to it or to another hand-operated device(9'). A safety switch device (16) . . . comprising at least one evaluation circuit and at least one enable button (18) connected to the evaluation circuit for transmitting signals is provided, which has an idle mode which is assumed automatically without applying operating force and two consecutive operating modes set on the basis of a differing strength of operating force and/or by different displacement distances in the form of an enable operation mode and a panic operating mode. Either an active mode is assigned to the at least one enable button (18) in which an enabling mode for running potentially dangerous control commands can be signalled or made available when the enable operation mode is assumed, or an inactive mode in which signalling or availability of the enabling mode is suppressed or not possible. When or after the evaluation circuit has detected on the basis of signals that the panic operating mode or the panic operating mode and the idle mode has been assumed, the active mode is assigned to the respective enable button (18). Also specified is a corresponding mobile hand-operated device (9, 9') and a corresponding safety switching device (16).

19 Claims, 3 Drawing Sheets

(51) Int. Cl.
 *G05B 9/02* (2006.01)
 *H01H 3/02* (2006.01)
 *H01H 9/02* (2006.01)

(56) References Cited

U.S. PATENT DOCUMENTS

| | | | |
|---|---|---|---|
| 5,522,043 A | | 5/1996 | Fukunaga |
| 5,705,906 A | * | 1/1998 | Tanabe et al. ............ 318/568.13 |
| 5,994,652 A | * | 11/1999 | Umemura ..................... 200/5 B |
| 6,108,179 A | * | 8/2000 | Katae et al. ..................... 361/31 |
| 6,160,323 A | | 12/2000 | Mayr et al. |
| 6,374,156 B1 | * | 4/2002 | Shimogama et al. ......... 700/245 |
| 6,627,830 B2 | | 9/2003 | Fukui et al. |
| 7,019,227 B2 | | 3/2006 | Fukui et al. |
| 7,154,197 B2 | * | 12/2006 | Suita et al. .................... 307/326 |
| 7,379,809 B2 | | 5/2008 | Yasui et al. |
| 7,403,837 B2 | * | 7/2008 | Graiger et al. ................ 700/264 |
| 7,501,778 B2 | | 3/2009 | Hashimoto et al. |
| 7,852,030 B2 | * | 12/2010 | Kamiya ....................... 318/563 |
| 2002/0091493 A1 | * | 7/2002 | Christopher et al. ......... 702/113 |
| 2002/0195883 A1 | | 12/2002 | Lazzaro |
| 2003/0018411 A1 | | 1/2003 | Suita et al. |
| 2003/0027107 A1 | * | 2/2003 | Fukui et al. ................... 434/100 |
| 2003/0184164 A1 | * | 10/2003 | Fukui et al. ................... 307/326 |
| 2005/0007032 A1 | * | 1/2005 | Dijkstra ......................... 315/291 |
| 2006/0212167 A1 | | 9/2006 | Nobuhiro et al. |
| 2009/0058193 A1 | * | 3/2009 | Reid et al. ..................... 307/116 |

FOREIGN PATENT DOCUMENTS

| | | |
|---|---|---|
| CN | 101168255 A | 4/2008 |
| DE | 100 23 199 | 1/2001 |
| EP | 0 208 328 B1 | 4/1994 |
| EP | 1 229 562 | 8/2002 |
| EP | 1 321 952 | 6/2003 |
| EP | 1 595 659 | 11/2005 |
| EP | 1 785 237 | 5/2007 |
| WO | WO 2005/098554 A1 | 10/2005 |

OTHER PUBLICATIONS

English translation of Chinese Search Report from Chinese Application No. 200980135245.2 (dated Nov. 14, 2012).

* cited by examiner

METHOD OF OPERATING A MOBILE HAND-OPERATED DEVICE FOR OUTPUTTING OR ENABLING POTENTIALLY DANGEROUS CONTROL COMMANDS AND CORRESPONDING HAND-OPERATED DEVICE

CROSS REFERENCE TO RELATED APPLICATIONS

This application is the National Stage of PCT/AT2009/000276 filed on Jul. 15, 2009, which claims priority under 35 U.S.C. §119 of Austrian Application No. GM 400/2008 filed on Jul. 21, 2008, the disclosure of which is incorporated by reference. The international application under PCT article 21(2) was not published in English.

The invention relates to a method of operating a mobile hand-operated device, provided as a means of outputting or triggering potentially dangerous control commands to a controllable technical device, and a mobile hand-operated device configured accordingly, as well as a safety switch device.

The use and functions of what are preferably three-stage and preferably dual-circuit enable buttons for mobile hand-operated devices and for similar mobile command devices are known from the prior art. Such enable buttons are used in combination with other input elements to enable potentially dangerous machine operations, such as teaching robots or setting up machine tools, to be run as safely as possible. A machine function selected using other input elements is run only when and for as long as the operator has switched the enable button from a non-operated state into a first operating mode, and in particular holds it depressed in an enable operation mode and is thus intentionally confirming the machine operation. If the operator releases the enable button, for example if an emergency situation occurs, or if the operator increases the operating force due to an emergency situation and thus switches the enable button from this first operating mode into another, second operating mode, machine operation is immediately halted. This second operating mode is often also referred to as an emergency-off or panic-operating mode. The enable button and the evaluation circuits and signal-transmitting components connected to it thus fulfil an important function as regards protecting people and valuable assets. These components are therefore usually based on a particularly safe design, i.e. in particular a totally dual-circuit design, in other words with a plurality of switching circuits which are separate but which operate in the same way, as well as being provided with contacts with positive opening operation so that a machine operation can be reliably stopped or interrupted even if a single technical fault occurs.

To enable work to be done for longer periods but without inducing fatigue as far as possible, it is of practical advantage if the enable button is ergonomically integrated in the hand-operated device so that it can be effortlessly operated with the hand by which the hand-operated device is being held, whilst the other hand can be used to operate various other control and input elements, for example a touch screen, a hand wheel, a joystick or such like. Since hand-operated devices are usually intended to be operated by both right-handed and left-handed persons and because the way in which they are handled may vary depending on the operating situation, hand-operated devices are provided with several enable buttons in different gripping positions as a rule. These various enable buttons can therefore be used or operated selectively or alternatively as a means of outputting an enable signal.

Patent specification EP 1 229 562 A1 discloses mechanical solutions for enable buttons, which are based on a dual-circuit and three-stage design and which ensure that the enabling signal remains locked when the enable button has been depressed into the panic position and the button is then released, temporarily assuming the enable position as a result. The electrical contacts for the enabling operation are not closed again until the operating mode has been switched from the non-operated main position into the enable position again, thereby authorising operation of the machine. This purely mechanical switching operation results in relatively complex and expensive designs as well as relatively large constructions due to the requirements relating to safety and operating reliability which have to be met at the same time.

Patent specification AT 408 325 B filed by this applicant discloses an enable button, whereby the locking functions and the suppressing function designed to avoid a brief enablement on switching out of the panic operating mode, which might be critical under certain circumstances, are no longer assumed by the mechanical elements of the enable button but are taken over by a special electronic evaluation circuit. The fact that the safety functions are moved from the actual switch mechanism to the electronic evaluation circuit means that a relatively more simple, relatively more robust and less expensive switch mechanism can be used and also offers more leeway in terms of design when adapting the mechanism as regards the different ways in which it can be integrated.

Patent specifications EP 1 321 952 A1 and EP 1 595 659 A1 disclose designs for switching several enable buttons of a hand-operated device whereby, after switching one of the enable buttons into its panic position so that the enabling signal to the machine is cancelled, enablement is not possible again until all the enable buttons of the hand-operated device are in the non-operated state and this has been confirmed.

Patent specification US 2003/0018411 A1 discloses a design whereby several enable buttons of a hand-operated device are also connected so as to output a joint activation or enabling signal, and an evaluation circuit ensures that the enabling signal is set only if exactly one enable button has been moved into the mode enabling operation and is cancelled if another enable button has also been moved into the mode enabling operation.

The designs known from the prior art ensure reliable operation of an enable button exclusively by means of constructive features such as the dual-circuit design of the contacts or sensor-type detection elements for determining the respective operating mode, as well as using electrical contacts with positive opening operation. With the designs known from the prior art, the enabling signal can be set at any time by operating an enable button. Relatively complex constructive features are used in an attempt to keep the likelihood of a fault which might result in a loss of safety sufficiently low.

The construction principle primarily used in the previously known prior art is that of single fault safety, i.e. the occurrence of a single fault will not lead to a loss of safety, in other words it must be possible for the enabling signal to be reliably cancelled, and incorrect output of the enabling or confirmation signal is prevented without the enable button having to be operated accordingly. The problem with this, however, is that the existence of a single fault often remains unnoticed and another fault can occur at some time which can then, in all probability, lead to a loss of safety.

The actual operation and detection of the idle position or idle mode and the enable operating mode of the enable button can be technically checked in principle due to the dual-circuit detection and evaluation system and a switch to these two modes forced if and even before the enabling signal is issued. The actual function of the panic operating mode remains unchecked prior to the enabling signal being output in the systems known from the prior art, however, and functioning or actual operation of the panic operating mode is solely reliant on the use of constructive features with a satisfactory degree of probability. However, a defect which might have occurred with respect to the enable button remains undetected.

Another problem of the systems known from the prior art resides in the fact that in the case of hand-operated devices with more than one enable button, all the enable buttons can be used in the same way to output the activation or enabling signal as a rule. Depending on the design and handling of the hand-operated device, however, situations can arise in which another or additional enable button is actually triggered unintentionally by a part of a hand or the body of the operator. In other words, there was in fact no intention to emit an enable signal from this enable button in the respective operating situation and enablement can often be triggered without knowing it. This is exacerbated by the fact that for ergonomic reasons, enable buttons are operating elements with a relatively large surface area that are readily accessible and the enable position can be easily assumed on the basis of only a slight amount of operating force, whereas a significantly stronger operating force or a longer displacement distance is needed in order to switch to the panic operating mode.

The underlying objective of this invention is to propose methods and devices by means of which the operation or handling of a mobile hand-operated device for issuing or enabling potentially dangerous control commands can be made as safe as possible without the need for devices based on a complex design or technically complex enable button.

In particular, it is an objective of this invention to propose methods and devices by means of which it can be guaranteed that an enable signal can not be output with an enable button unless the functioning and detection of the panic operating mode has been technically checked and confirmed.

Another objective of the invention is to propose features by means of which it is possible to use one of several enable buttons which can be used as alternatives without leading to safety problems and without unintentionally emitting an enable signal and causing critical states without generally impairing the intended way of functioning.

Independently of the above, another objective is to propose a technical solution which as far as possible offers an intuitive and simple option for selectively switching between several enable buttons provided on a hand-operated device.

At least the first of the above-mentioned objectives is achieved by the features defined in a method described herein. The method is for operating a mobile hand-operated device provided as a means of outputting or enabling potentially dangerous control commands on a controllable technical device actively connected to it or to another hand-operated device, in particular a robot or a machine tool, with a safety switch device including at least one evaluation circuit and at least one enable button connected to the evaluation circuit for transmitting signals. The at least one enable button has an idle mode automatically assumed without operating force and has two consecutive operating modes set on the basis of differing strengths of operating force and/or different displacement distances, namely an enable operation mode and a panic operating mode. Either an active mode is assigned to the at least one enable button in which an enabling mode for running potentially dangerous control commands can be signalled or made available when the enable operation mode is assumed, or an inactive mode in which signalling or availability of the enabling mode is suppressed or not possible. The active mode is assigned to the respective enable button when the evaluation circuit has detected on the basis of signals that the panic operating mode or the panic operating mode and the idle mode have been assumed.

A major advantage of the features proposed by the invention resides in the fact that the safety switch device offers or guarantees increased operating and functional safety and is thus able to satisfy stringent safety requirements. Any risks to safety due to technical failure of the safety switch device can be sharply reduced or virtually ruled out as a result. In particular, these features ensure that enablement can not be signalled by means of an enable button or a enabling signal can not be applied to the controllable technical device unless the second operating mode, i.e. the panic operating mode, of this enable button can actually be assumed and can be reliably detected. In other words, an enable signal can not be forwarded or signalled to the controllable technical device by means of an enable button unless the enable button is functioning and this enable button can therefore also guarantee the increase in operating safety for which it was designed inside the technical device. As proposed by the invention, therefore, an enabling mode can not be signalled by means of an enable button unless it can also be at least switched into the panic operating mode so that the control commands or routines which might endanger safety can be immediately terminated in the event of emergency or panic situations or the technical device actually causes a safe operating mode. The advantageous variant or alternative which incorporates precautionary checking and signal-based detection of the panic operating mode and idle mode offers an advantage in that an enable signal can not be enabled or output by means of an enable button unless both the panic operating mode and the idle mode, i.e. the non-operated state, has been assumed and detected as being free of faults beforehand and the enable button is therefore able to function as planned or intended. This means that it will be possible for potentially dangerous control commands to be terminated safely and reliably if necessary. This significantly increases or raises the safety level or safety stage as a result. Another major advantage of these features resides in the fact that the mechanism of the enable button or enable buttons can be based on a relatively simple design whilst nevertheless offering a high degree of operating reliability or operating safety. In particular, the switch mechanism may be of a relatively simple design because the panic operating position is frequently tested by the evaluation circuit or safety switch device or at least checked before the enable button is activated by the control system. Consequently, a simpler mechanical or electrical construction may be used, thereby bringing advantages in terms of lower manufacturing costs as well as advantages with regard to permitting a more compact design for enable buttons of this type. This means that made contact elements may optionally be used to detect the panic operating mode whilst nevertheless meeting high safety requirements. Until now, it has been virtually an absolute requirement to use contacts with positive opening operation to detect the panic operating mode in order to meet increased safety requirements. The featues proposed by the invention therefore enable the use of simpler mechanical or electromechanical and electrical designs.

The advantage of another embodiment of the method in which the active mode is not assigned until the panic operating mode has been detected several times, in particular two times, within a predefined period without the panic operating mode being detected in between is that a special or predefined and deliberate control action is needed in order to activate an enable button or switch it to the active mode. The likelihood of inadvertent or undesired triggering of the active mode or unintentional switching between the inactive and active mode is therefore significantly reduced. Incorrect or erroneous control actions and detrimental consequences that could occur as a result are therefore sharply reduced or eliminated.

The advantage of using the features that the inactive mode is assigned to the at least one enable button after it has been switched to the panic operating mode and the active mode had already been assigned to it beforehand is that an enable button must also be specifically and deliberately deactivated by the user and can be switched to the inactive mode. It is of particular advantage as a result that when switching an enable button from the active mode into the panic operating mode, i.e. when switching to the second operating mode in the event of an actual emergency or panic situation, this enable button is automatically deactivated once the safety-relevant modes have been initiated or applied and switched to the inactive mode. A particular advantage of this is that once the operator has released the enable button and does not intend to use it again immediately, enablement is signalled. This means that when a panic operating mode is initiated, an immediate, usually unintended switch to the enable operation mode will not lead to signalling or output of an enable signal.

The advantage of the embodiment in which the enabling mode is suppressed or cancelled if an enable button is placed in the panic operating mode irrespective of whether the active or inactive mode is prevailing at this enable button is that the panic operating mode can be actively initiated from each of the several enable buttons. This means that if there is more than one enable button, any enable button can be operated by the user to initiate a panic-stop mode irrespective of whether the active or inactive mode is prevailing. Accordingly, irrespective of whether the mode is currently active or inactive, control commands which might lead to safety risks can be reliably terminated by every one of the enable buttons or a switch can be made to a safe operating mode. This increases reaction time if potential emergency situations occur. Safety is also increased due to the fact that the panic switch off system can be operated by each of the plurality of enable buttons and this panic switch off system is not dependent on whether the active evaluation mode has been enabled or assigned. This obviates the need to detect whether enable buttons are in the active mode, which is time-consuming and susceptible to errors.

The features that the enabling mode is suppressed or cancelled if all the enable buttons to which the active mode has been assigned are in the non-operated idle mode ensure that no enabling signal is emitted in the case where a plurality of enable buttons is provided and several of them are in the active mode but none of these enable buttons is being operated. This means that no enabling signal is present or output without active confirmation being given by a user from an enable button which is in the active mode. Furthermore, enable buttons which are in the inactive mode and are switched by the user to the enable operation mode are ignored by the evaluation circuit or evaluated as being an enable button by means of which an enabling signal can not be output.

The feature that the enabling mode is suppressed or cancelled if the inactive mode has been assigned to every enable button ensures that an enabling mode cannot be initiated from an enable button or from those enable buttons at which the inactive mode prevails. This rules out the possibility of unintentional or unintended enablement by the user, which could otherwise lead to a potentially dangerous control or machine operation. This also ensures that the enabling mode signalled with an enable button will be resumed as soon as the active mode is withdrawn from and the inactive mode assigned to this enable button, for example by a general reset signal or by the running of a timer or due to activation of another enable button.

As a result of the feature that the inactive mode is assigned to every enable button after a supply voltage for the hand-operated device or for the safety switch device is switched on or after applying a common reset signal for the evaluation circuit or enable buttons or after transmitting an initialization command to the evaluation circuit, the enable button or enable buttons can be switched to a defined initial mode or to a reset mode which can be initiated as and when necessary. This means that when the hand-operated device is switched on, it is always necessary to actively select the desired enable button or the one that is best placed from an ergonomic point of view, as it were, and activate or permit the panic operating mode by a one-off operation before enablement can be signalled with this enable button in order to run potentially dangerous control commands.

When the active mode is assigned to one enable button within a group of several enable buttons, the inactive mode is assigned to all the other enable buttons of this group, and the advantage of these supplemental features is that only exactly one of several enable buttons is ever in the active mode. The risk of unintentionally triggering an enabling signal by means of an enable button other than the one provided and selected for the particular handling situation is reliably prevented as a result. The output of undesired enabling modes is also reliably prevented in situations where, for ergonomic reasons, the respective enable buttons can be switched very easily to the enable operation mode, i.e. the first operating mode. The operating surfaces of the enable buttons may be designed with a relatively large and easily accessible surface area, whereas in the past, this would have posed a risk of such an enable button being unintentionally operated whilst holding the hand-operated device, for example by the palm of the hand. Such risks are now eliminated or minimized because a specific enable button must be deliberately activated by the operator of the hand-operated device before an enabling signal can be output. This also makes for a particularly simple and intuitive, as well as relatively rapid selection of an enable button from a plurality of enable buttons.

The feature that a timer is started when the operating mode of an enable button is switched from the enable operation mode to the panic operating mode or from the panic operating mode to the enable operation mode and when a period predefined by the timer has elapsed, the inactive mode is assigned to the enable button or to each of the enable buttons ensures that the process of detecting the panic operating mode, i.e. the second operating mode, is regularly tested. As a result, even if hand-operated devices are constantly switched on or constantly connected to a machine, this ensures that a defect which has occurred at an enable button in the meantime is detected in good time before intended use and any other use of the hand-operated device and the running of potentially dangerous machine commands is prevented in an emergency until a switch has been made or corrective maintenance has been undertaken.

As a result of the feature that a timer with a predefined sequence time is started when an enable button assumes the panic operating mode or when the operating mode of an enable button is switched from the panic operating mode to the enable operation mode or from the panic operating mode via the enable operation mode to the idle mode, and the signalling or availability of an enabling mode remains locked until it has elapsed, the enable button is advantageously fully depressed into the panic operating mode first of all in a panic situation and the technical device or system is halted as a result. However, releasing the enable button and depressing it again will not undesirably release the enabling signal again and start up the technical device or system again or enable the movement or technical process to be continued. These features enable the safety of persons and/or objects or parts of the equipment to be significantly improved.

As a result of the advantageous features that a timer with a predefined time is started when the enabling mode is activated and signalling or availability of the enabling mode is terminated when this time has elapsed, the enabling or enabling signal can be activated continuously for only a predefined, limited period. This effectively prevents an enable button from being fixed permanently in its enable operating mode for reasons of convenience using some additional means, for example adhesive tapes or clamping elements, which would result in a loss of its safety function.

The advantage of the embodiment in which before the predefined time elapses, a signalling element is activated which transmits an optical, acoustic and/or tactile signal effect to the user of the hand-operated device is that the user is informed or provided with an indication in advance that the period is about to elapse so that operation of a machine will not be undesirably halted in the middle when operating a machine. For example, the user can release and then operate the enable button again up to a point in time that is suitable for him and for operation of the machine.

The advantage of the features that before the predefined time elapses, the user of the hand-operated device can operate an input element to extend the predefined time or restart the timer is that it is not necessary to release the enable button and operate it again in order for it to remain active or enabled. In particular, the timer can be extended or restarted by deliberately operating a special multi-functional input element especially provided for this purpose, thereby avoiding an unsuitable or detrimental interruption to the enabling signal.

When at least the enable operation mode and panic operating mode (P) of an enable button and preferably also the idle mode of an enable button are detected by dual- or multi-circuit redundant, when sensor-based detection circuits, the detection signals of the detection circuits are evaluated by the evaluation circuit on a dual- or multi-circuit basis, and when an enabling mode is detected on a dual- or multi-circuit basis respectively dual- or multi-channel basis and transmitted to a controllable technical device, a single fault safety system results. Accordingly, the enabling signal can still be reliably cancelled if a single fault occurs. In other words, the technical device or potentially dangerous machine operation is enabled precisely when both detection circuits are detecting and signalling enablement on a concurring basis and only then. The safety of the safety switch device is significantly increased as a result.

The advantage of the features that the active mode is not assigned until it has been established that each one of the redundant sensor-based detection circuits has assumed the panic operating mode is that an enable button is not enabled for the purpose of issuing an enabling signal unless the panic operating mode is detected by each of the plurality of detection circuits on a concurring basis. This means that the enable button can not be activated unless the panic operating mode can be detected as being totally fault-free. Even a single fault will therefore be detected in good time, before another fault occurs and leads to a loss of safety.

The advantage of the features that a programming or a so-called teach mode is not activated or control elements for emitting potentially dangerous control commands are not enabled until at least the active mode has been assigned to at least one enable button is that operating modes of the hand-operated device which enable potentially dangerous control commands activating potentially dangerous operating modes are not enabled unless the active mode has been assigned or could be assigned to at least one enable button beforehand and a check has therefore been run to ensure that a safety shutdown or termination of potentially critical control commands can actually be undertaken if necessary, i.e. in emergency or panic situations.

The advantage of the features that a display or information is output by means of a visually perceptible output device, for example by means of a screen of the hand-operated device or by means of a lamp means on the enable button or close to the enable button, indicating whether the active mode has been assigned to an enable button and optionally to which enable button is that an operator can generally relatively rapidly and easily tell which enable button has been assigned the active mode. It is also possible to tell instantly that an enable button provided for use under certain circumstances has not yet been activated. The operator is quickly aware of this and will not be in the position of effecting a control action using a non-activated enable button that will have no effect.

An approach in which information or a signal is output by means of a visually perceptible output device, for example by means of a screen of the hand-operated device or by means of a lamp means on the enable button or close to the enable button, if an enable button to which the inactive mode has been assigned is switched to the enable operation mode is also of advantage because the respective user is informed accordingly if he has effected an unsuitable or an ineffectual control action and is made aware of the cause, which avoids delays in the intended control action. Furthermore, the user is prevented from being confused or surprised if he has made unsuitable control attempts or operated enable buttons without effect. In particular, the user is provided with an indication accordingly if he tries to initiate enablement in order to run potentially safety-critical control commands by means of an enable button to which the inactive mode is assigned. Such incorrect control attempts are immediately signalled to the user as being ineffective or it is indicated that they will not lead to the intended effect. This specifically means that errors on the part of the operator can be remedied as quickly as possible.

The objective of the invention is also achieved by means of a mobile hand-operated device as described herein. The effects and technical actions which can be achieved as a result may be found in the parts of the description given above.

A solution to another independent objective outlined above is achieved by a safety switch device as described herein. The effects and technical actions which can be achieved as a result may likewise be found in the parts of the description given above.

By using a mobile hand-operated device as described herein and a safety switch device as described herein, an activation or enabling signal can not be set with an enable button unless at least the panic operating mode can actively be assumed at this enable button and preferably all the available operating modes—including the idle mode—can be assumed and made functionally active. This means that an enabling signal can not be generated or emitted by means of an enable button until a signal-based check has been run to ascertain whether at least the panic operating mode can be assumed at this enable button and the result of the check was positive.

To provide a clearer understanding of the invention, it will be described in more detail below with reference to the appended drawings.

The drawings provide schematically simplified diagrams as follows.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
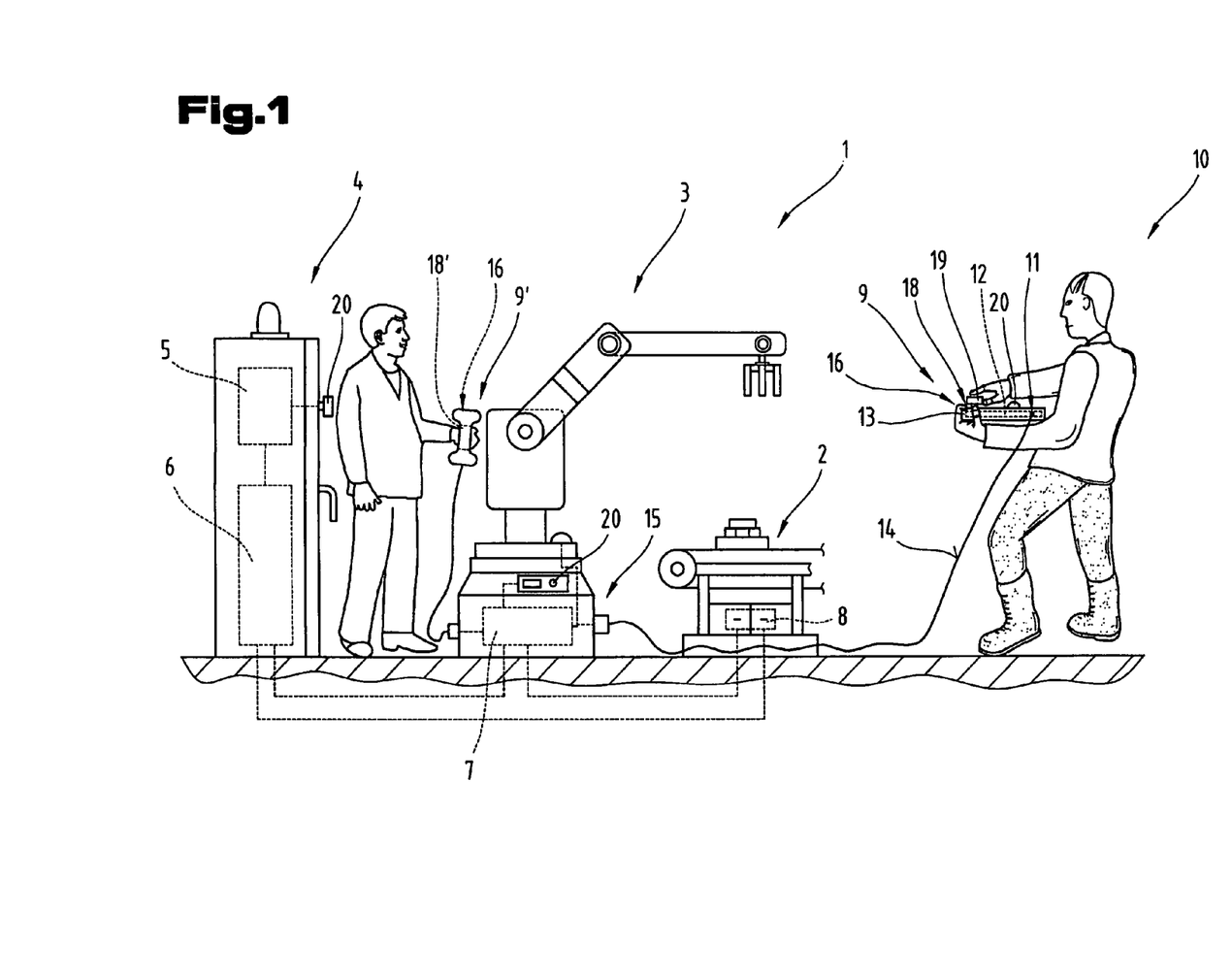
FIG. 1 illustrates an example of an embodiment of a technical device, which can be controlled or acted on by means of mobile hand-operated devices.

FIG. 1 is a schematic illustration of an example of an embodiment of a technical device 1 for automatically, semi-automatically and/or manually handling or processing objects or workpieces. A technical device 1 might also be configured to run or monitor other technical processes on an automated basis. In particular, the technical device may be a machine tool or processing machine, for example an injection moulding machine or sheet metal bending press.

The technical device 1 may also comprise one or more electrically controlled machines 2, such as processing machines or conveyor or transport systems and/or robots 3 or other manipulators and such like.

In addition to various mechanical components, the technical device 1 also has at least one electrical or electronic control unit 4, comprising a central control device 5 or several decentralised, mutually connected or networked control devices 6, 7, 8 for various parts of the system, for example for a machine 2 and/or a robot 3. The decentralised control devices 6, 7, 8 are preferably directly assigned to the controlling part of the system or disposed in the vicinity of it.

At least one mobile hand-operated device 9, 9' can be connected to the control unit 4 of the electromechanical device 1. The hand-operated device 9, 9' is preferably of a compact and lightweight design so that it can be carried effortlessly by an authorised operator 10 of the technical device 1.

In order to connect the hand-operated device 9 to the control unit 4 or to at least one of the control devices 5-8 of the technical device 1 as necessary or periodically, the hand-operated device 9 has at least one interface 11. This interface 11 is usually disposed on a control device 12 of the hand-operated device 9. This control device 12 is preferably accommodated in the interior of a housing 13 of the hand-operated device 9 so that it is protected against direct access from outside.

The interface 11 may be programmed to establish a hard-wired connection via a cable 14 and/or to establish a wireless active connection to the control unit 4 or to at least one of the control devices 5 of the device 1. Via this at least one wireless and/or hard-wired interface 11 on the hand-operated device 9, the latter can therefore be connected to the control unit 4 or to individual ones of the control devices 5-8 to transmit signals or data as and when necessary. To this end, at least one co-operating interface 15 is provided on the control unit 4 or on the at least one of the control devices 5-8 of the technical device 1.

The mobile hand-operated device 9 is used at least to influence the operating functions or operating mode of a machine 2, robot 3 or some other technical parts of the system of a general technical process. In addition, the hand-operated device 9 may be used to display process data and/or to observe working modes and operating modes of a technical device 1. It is only possible to influence such processes or display such processes if the mobile hand-operated device 9 is correctly and actively connected via the interface 11 to the co-operating interface 15 of the respective device 1 or respective part of the system so as to transmit data and signals.

In addition to the functions described above, the hand-operated device 9 may be used, alternatively or in combination, for programming the sequences, in particular motion or control sequences, of machines 2 or robots 3 provided with actuators and sensors. In such a programming mode of the hand-operated device 9, it is possible to undertake what is referred to as the "teaching" of machines 2 or robots 3. The control or motion sequences are then stored in a memory and can subsequently be run automatically or on an automated basis by the machine 2 or robot 3. When a machine 2 or robot 3 is operating on a fully automated basis, the safety of personnel is usually assured by closed and monitored protective fences or similar barriers, whereas safety during so-called "teaching" is dependent on the respective safety control features because when running different programming, editing and set up tasks it is necessary for the operator to be present in the immediate vicinity of the potentially dangerous parts of the system. This being the case, an essential safety feature is the active and deliberate enabling of every potentially dangerous machine operation and visual monitoring until these are terminated by an operator who has been trained accordingly. For this purpose, the operator must actively and consciously signal and thus confirm to the system controller during the entire time during which such an operation is being run that a fault-free and risk-free operating mode prevails. As soon as this confirmation or enabling signal is no longer being signalled, the system is immediately switched to a safe operating mode and every potentially dangerous machine operation is halted as quickly as possible.

The hand-operated device 9 is therefore designed to output or enable potentially dangerous control commands to a controllable technical device 1, in particular a robot or machine tool actively connected to this hand-operated device 9 and/or to another hand-operated device 9' in a manner which guarantees the safety of persons and equipment as far as possible. To this end, the at least one hand-operated device 9, 9' has, amongst other things, at least one safety switch device 16, which may best be seen by viewing FIG. 1 and FIGS. 2 and 3 in combination.

Figure 3:
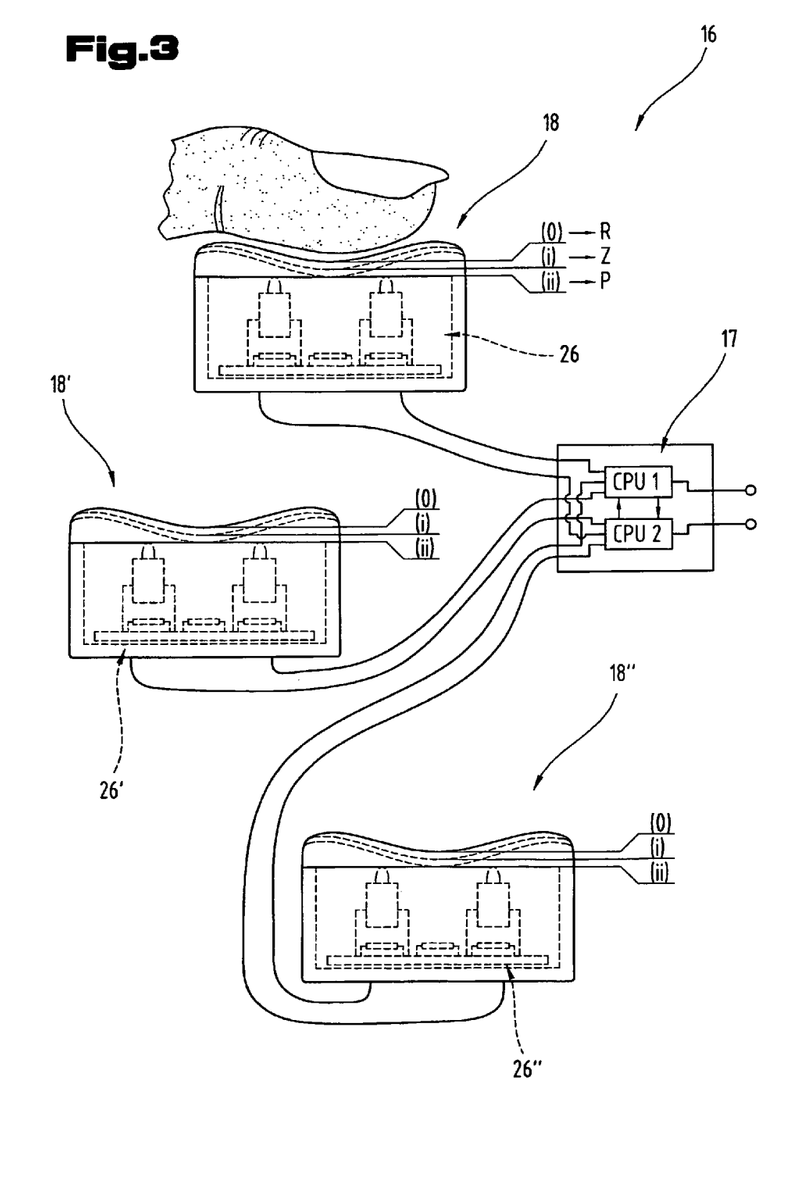
FIG. 3 illustrates a safety switch device comprising three, for example three-stage, enable buttons connected to an electronic evaluation circuit for the respective operating modes and operating sequences.

This safety switch device 16 comprises at least one electronic evaluation circuit 17 and at least one enable button 18, 18', 18" connected to the evaluation circuit 17 so as to transmit signals. At least one of the enable buttons 18-18" but preferably all of the enable buttons 18-18" are based on a three-stage design. In particular, such an enable button 18-18" has an idle mode (0) which is assumed automatically without it being necessary to apply force and two fixed, consecutive operating modes (I, ii) which are assumed by applying a differing operating force and/or by different displacement distances. The first operating mode (i) defines an enable operation mode (Z), by means of which the user signals a confirmation to run potentially dangerous control commands. The second operating mode (ii) defines a panic operating mode (P), and when this is assumed, in the same way as when the idle mode (0) is assumed, the potentially dangerous control command is terminated or the technical device 1 is switched to a defined, safe operating mode.

The safety switch device 16 or at least one of the enable buttons 18-18" is operated in a predefined manner in order to output or enable a control command which is potentially dangerous or needs to be made safe in combination with a control element 19 of the hand-operated device 9, 9' which halts or initiates this control command. In particular, it is not possible to continue running a potentially dangerous control command unless at least one of the enable buttons 18-18" is or was switched by the operator to the first operating mode (i), i.e. to the enable operation mode (Z) and the evaluation circuit 17 has detected or evaluated this first operating mode (i) as being a valid enabling mode for running a potentially dangerous control command. A potentially dangerous control command is then output and run by operating the enable button 18-19" throughout the running time whilst simultaneously controlling the corresponding control element 19 in the desired manner.

The standard or conventional way of operating a three-stage enable button 18-18" is such that in the non-operated idle mode (0), a potentially dangerous control command is prevented from being run or is terminated whereas when the first operating mode (i) is assumed, i.e. the enable operation mode (Z), a confirmation is signalled by the operator in order to run potentially dangerous control commands. The second operating mode (ii) of the enable buttons 18-18", i.e. the panic operating mode (P), is evaluated by the evaluation circuit 17 as being an emergency stop mode in which potentially dangerous control commands are terminated immediately or the technical device 1 is switched to a safe operating mode.

The operating modes "non-operated" and "panic-stop" of an enable button 18-18" on the machine 2 or robot 3 usually lead to exactly the same reactions, i.e. to a halting of the drives or a changeover to a safe operating mode. As a rule, panic-stop is not treated as being more critical than releasing the enable button 18-18". Accordingly, it is only in the evaluation circuit 17 in the hand-operated device 9, 9' that a distinction is usually made between the two modes idle mode (0) and panic operating mode (P).

Independently of the designs of a hand-operated device 9 described above with at least one control element 19 and with various input and/or output elements, the hand-operated device 9' may also be provided in the form of nothing more than what is technically a relatively simple mobile enabling device. Such a mobile enabling device or such a mobile hand-operated device 9' is used to emit an enable signal by a second person, who remains with the actual operator in the working area that is at risk and assists the operator, for example carrying out servicing or adjustment tasks. In this instance, potentially dangerous control commands are only possible when and as long as both or all persons are signalling confirmation.

At least one emergency-off switching device 20 may be provided on the hand-operated device 9, 9', by means of which an immediate stop or emergency halting of at least a part of a machine 2, robot 3 or technical process functionally connected to it can be initiated if necessary. This emergency-off switching device 20 is primarily provided as a means of averting or instantly pausing safety critical or dangerous situations within the technical device 1. Such emergency-off switching devices 20 are usually also provided on other parts of the system and are readily visible, clearly recognisable and easily accessible so that they can be reached and operated rapidly in the event of an emergency.

Emergency-off switching devices 20 are integrated in a generally known safety switch circuit of the control unit 4, although this is not illustrated, which essentially causes at least the affected safety-critical parts of the device 1 to be halted, switched off or rendered without power if an emergency-off mode prevails. To this end, the emergency-off switching device 20 on on the hand-operated device 9 should therefore be integrated via the interface 11 or optionally via an independent interface in the safety switch circuit of the control unit 4 or technical device 1 or at least actively connected to it.

Figure 2:
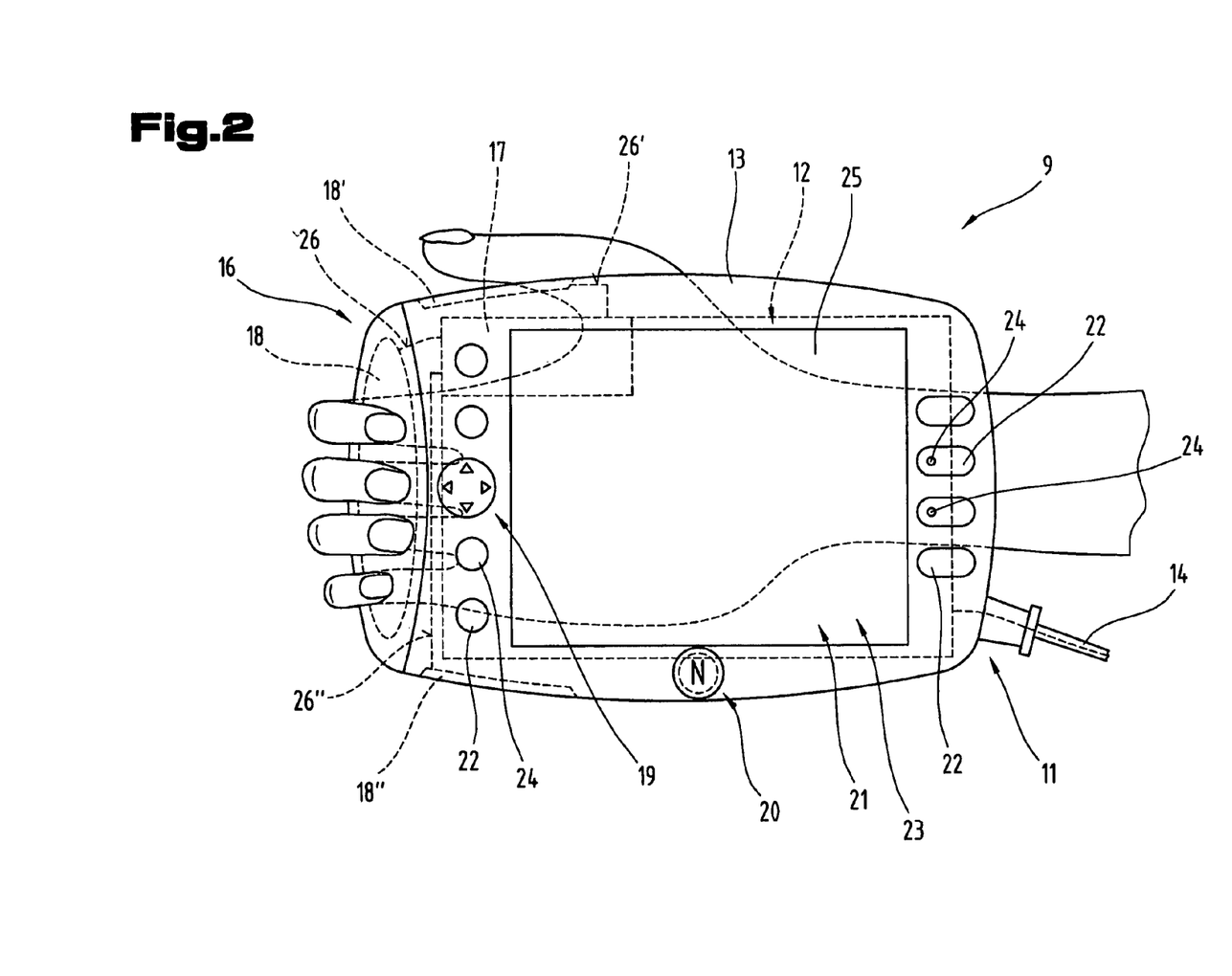
FIG. 2 illustrates one possible embodiment of a hand-operated device comprising a safety switch device with a total of three separately arranged enable buttons.

As may best be seen from FIG. 2, at least one input device 21 is provided on the hand-operated device 9 for influencing motion or function sequences of a technical process or a technical device 1. However, this at least one input device 21 may also be used to-influence, edit or set up internal sequences or operating modes of the hand-operated device 9 itself. The input device 21 is therefore provided at least as a means of controlling a technical device 1 and preferably also for influencing the operating functions of the hand-operated device 9. To this end, the input device 21 may have at least one input element 22 in the form of keys, switches, dial or rotary regulators and such like. In order to input control commands for running motion sequences, the input device 21 may also have at least one control lever, for example in the form of a multi-axis joystick or some other control element, for example in the form of a so-called trackball. It would also be conceivable to provide the control lever in the form of a so-called "force-feedback paddle", by means of which responses to the operator can be generated. Alternatively or in combination with this, motions may also be controlled by means of a so-called cursor keypad.

In addition to the general input devices 21 for inputting control commands, selecting operating functions or navigating function menus of the hand-operated device 9, at least one rapidly and safely accessible emergency-off switching device 20 is provided on at least one part of a technical device 1 connected to the hand-operated device 9 for providing the generally known emergency-halt or emergency-stop function. When operating this emergency-off switching device 20, the technical device 1 as a whole or at least a safety-critical part of the system connected to the hand-operated device 9 for transmitting signals and data is placed in a safe mode. A safe operating mode of a technical device 1, machine 2, robot 3 or such like exists when routines that potentially pose danger to people or objects, in particular specific motion sequences, processing routines, conveying routines or irradiation procedures, are actively prevented. This will be the case in many situations when the power supply to the actuators or drive units of the system or respective part of the system is cut off.

The emergency-off switching device 20 of the hand-operated device 9 is integrated in or connected to the safety switching circuit of the technical device 1 during the function-enabling operating mode. In addition to providing the emergency-off function, the safety switching circuit also deals with or manages enabling signals from the enable buttons 18-18", in particular their evaluation circuit 17, status information about protective doors, protective fencing or photoelectric barriers, park position information about specific machine components or such like.

When an emergency-off switching device 20 disposed on the hand-operated device 9 or at some other point of the technical device 1 and connected to the safety switching circuit is manually operated, the respective machine 2 or co-operating machine part is instantly switched to a safe mode. This safe operating mode is maintained until all the emergency-off switching devices 20 of a technical device 1 or a part of the system have been consciously switched back to a non-operated mode.

The enable buttons 18-18" on the hand-operated device 9 act so that safety critical movements or functions are not run via the mobile hand-operated device 9 unless at least one of the plurality of enable buttons 18-18" is operated in a predefined way. These enable buttons 18-18" therefore ensure that safety-critical or dangerous functions, in particular functions involving motion, cannot be run unintentionally or inadvertently. In particular, the corresponding control commands are transmitted via the interface 11 from the control element 19 and/or from a cursor keypad and/or from a touch-sensitive screen 25 to the control unit 4 of a technical device 1 exclusively when the enable button 18-18" has been consciously operated in a defined way, in particular on assuming the enable operation mode (Z). In other words, control commands which might potentially result in danger under certain circumstances are run or implemented only whilst at least one enable button 18-18" is being operated. The enable buttons 18-18" can be operated by at least one finger or by the thumb and/or by several fingers of one of an operator's hands, as may be seen from FIG. 2 in particular for example. The operation of an enable button 18-18" generally acts via the separately disposed safety circuit directly on the actuators or drive units of a machine. A reliable shut-down can therefore be achieved, even if there is a defect in the machine controller.

To enable the hand-operated device 9 to be used as an observation tool as well, it is also preferable to provide at least one output device 23. This at least one output device 23 comprises several optical signalling elements 24, for example light-emitting diodes, glow lamps or such like, by means of which the respective switch status or various alarm states can be signalled, for example. As another optical, visually perceptible output device 23, it is also preferable to provide a touch-sensitive screen 25, in particular a so-called touch screen, which in design terms may also be referred to as a combined input and output device 21, 23. On this screen 25, which preferably has graphics capability, a range of different graphics, symbols and sequences can be displayed and visually consulted. In addition, by touching specific zones of the graphic user surface of the screen 25, specific inputs and selections can be made. This touch-sensitive screen 25 preferably occupiers a large partial area of the top face of the housing 13 of the hand-operated device 9 and constitutes the main element for inputting and outputting commands and data.

It would naturally also be possible to use any other shapes of housing known from the prior art. It is not absolutely necessary to provide a housing 13 that is rectangular or T-shaped in plan view and instead, it would naturally be possible to opt for elliptical or circular housing shapes.

Especially if the safety-relevant safety switch device 16 comprises at least one, in particular two or more, enable buttons 18-18", it is essential that the at least one electronic evaluation circuit 17, which is also part of the control device 12 and may be integrated in it, evaluates the respective idle modes (0) or operating modes (i, ii) of the enable buttons 18-18" so that there is a minimum of potential risk to persons, in particular operators, and/or to technical components of the technical device 1.

The essential aspect is that either the active mode in which an enabling mode for running potentially dangerous control commands is signalled on assuming the first operating mode (i), i.e. the enable operation mode (Z), or an inactive mode can be assigned or output to the at least one enable button 18-18" of the hand-operated device 9 or the associated group of enable buttons 18-18" on a plurality of hand-operated devices 9, 9' in which signalling or the output of an enabling mode can basically be suppressed or disabled. This means that either an active mode or an inactive mode is assigned to each of the enable buttons 18-18". This assignation or allocation of the two operating or function modes is preferably implemented by the evaluation device 17 and the respective allocations of the active mode or inactive mode are made and stored in the evaluation circuit 17.

Accordingly, it is only possible to initiate an enabling mode or apply an enable signal to run potentially dangerous control commands at the enable button 18-18" or those enable buttons 18-18" which have been assigned the active mode or which have been validated as active and flagged as enabled for the evaluation circuit 17. In particular, the expression "active mode" should be construed as meaning a readiness or capability of the respective enable button 18-18" to signal or output an enabling mode. Accordingly, if the inactive mode has been assigned to an enable button 18-18", it is not possible for an enable signal to be initiated or generated via this quasi inactive enable button 18-18".

The essential aspect is that it is not until when or after the evaluation circuit 17 has detected on the basis of signals that at least the second operating mode (ii) has been assumed, i.e. the panic operating mode (P) or the panic operating mode (P) as well as the idle mode (0), that the active mode is assigned to the respective enable button 18-18". This advantageously ensures that an enabling signal cannot be output or initiated using an enable button 18-18" unless the panic-stop mode or the panic operating mode (P) has been assumed and can be reliably detected at this enable button 18-18" and the action enabling a potentially dangerous control command can actually be cancelled by the operator. In other words, a check is run beforehand to ascertain whether the enable button 18-18" is functioning or whether its intended functionality is working before the active mode is assigned to it. This ensures that if necessary in an emergency or panic situation, it will be possible for this enable button 18-18" to actually assume the panic-stop mode and be activated accordingly. This ensures that an enabling signal cannot be output unless the function and detection of at least the panic operating mode (P) or alternatively the panic operating mode (P) and the idle mode (0) has been technically checked and confirmed.

As proposed by the invention, therefore, the enabling function of an enable button 18-18" is locked until the enable button 18-18" has been placed at least once in the second operating mode (ii), i.e. in the panic operating mode (P). Only then is the enabling function activated. This ensures that it is only possible to activate or apply an enable signal if this enabling signal can be actively cancelled again if the enable button 18-18" is switched to the panic operating mode (P).

Based on one advantageous embodiment of the invention, if using several enable buttons 18-18" on a hand-operated device 9, 9", there is always-only one of the enable buttons 18-18" which can be used to activate the authorisation or enabling signal. The way in which the enable button 18-18" is selected is such that the desired enable button 18-18" is moved to the panic operating mode (P). This ensures that when the hand-operated device 9, 9' is switched on and before an authorising or enabling signal is applied, the enable button 18-18" which has been used is fully tested. In this respect, however, this does not necessarily mean that each of the enable buttons 18-18" is operated but rather only the one or those actually intended for this purpose. It is also of particular advantage that an enabling signal cannot be accidentally triggered from the enable buttons 18-18" not intended for this purpose.

The features proposed by the invention therefore also enable a simple, rapid and intuitive selection of one enable button 18-18" from a plurality of enable buttons 18-18" which may be used selectively.

An authorising or enabling signal is generated or emitted as standard only when the operating mode of a three-stage enable button 18-18" is switched from the idle mode (0) to the enable operation mode (Z). This ensures that when the enable button 18-18" is released from the operating mode (P) via the enable operation mode (Z) to the non-operated idle mode (0), a brief enablement cannot be temporarily and unintentionally signalled.

Based on one advantageous embodiment, the active mode is not assigned to an enable button 18-18" until the second operating mode (ii) has been detected several times, in particular two times, i.e. the panic operating mode (P) has been detected several times. It is of practical advantage if this detection takes place within a predefined time defined by the evaluation circuit 17 or by a timer of the evaluation circuit 17 and the panic operating mode (P) is not detected or not present in between. This means that the panic operating mode (P) must be detected two or several times consecutively within a predefined period before the active mode is assigned to the relevant enable button 18-18". Outside this predefined period, which may be 2 to approximately 5 seconds for the occurrence of two or several panic operating modes (P), which may be emitted by only one of the enable buttons 18-18", the active mode is not assigned to this enable button 18-18".

Based on one advantageous embodiment, it is of practical advantage to switch an enable button 18-18" to which the active mode has already been assigned to the inactive mode after it has been switched to the panic operating mode (P) or after the panic operating mode (P) has been actively signalled via this enable button 18-18". This prevents an immediate switch back to active in the first operating mode (i), i.e. in the enable operation mode in which an enabling mode would then be signalled if the operator has unknowingly or unintentionally depressed an enable button 18-18" which had previously assumed the panic operating mode (P). If an enable button 18-18" which was previously switched to the panic operating mode (P) is deactivated, an unintended or immediately following changeover to the enable operation mode (Z) will not cause the output of an enable signal that was not actually intended and is not desired and, in some situations, might be critical. This embodiment also enables the user to activate and deactivate the individual enable buttons 18-18" selectively.

Another optional feature of the method which offers an advantage and which is preferably also implemented by the evaluation circuit 17, is one where signalling of an enabling mode is suppressed or cancelled if an enable button 18-18" is switched to the second, i.e. panic operating mode (P) irrespective of whether the active mode or inactive mode is prevailing at this enable button 18-18". Accordingly, from a control or evaluation point of view, it is irrelevant whether an enable button 18-18" is in the active or inactive mode; the output or signalling of a panic operating mode (P) is therefore possible in every situation.

The evaluation circuit 17 may also ensure that the output or signalling of an enabling mode for running potentially dangerous control commands is suppressed or cancelled if all the enable buttons 18-18" to which the active mode has been assigned are in the non-operated idle mode (0). Consequently, if none of the plurality of enable buttons 18-19" that are in the active mode is operated, the enabling signal is cancelled and does not prevail. This means that without an active confirmation by a user from an active or enabled enable button 18-18", no enabling signal is present or emitted. Furthermore, if a non-active enable button 18-18", i.e. an enable button 18-18" at which the inactive mode prevails, is switched by the operator to the first operating mode (i), i.e. to the enable operation mode (Z), the evaluation circuit 17 will ignore or not implement this enable operation mode (Z).

Similarly to the method feature described above, the evaluation circuit 17 will ensure that the enabling mode or an enabling signal is suppressed or cancelled if the inactive mode has been assigned to each enable button 18-18". This means that no enabling mode or no signal indicating an enabled state can prevail via enable buttons 18-18" that have been switched to the inactive mode.

It is also of practical advantage if the evaluation circuit 17 is always run so that when the active mode has been assigned to an enable button 18-18" within a group of several enable buttons 18-18", the inactive mode is assigned to all the other or remaining enable buttons 18-18" of this group. As a result of this feature, only one of the plurality of enable buttons 18-18" is ever active. The risk of unintentionally triggering enablement with an enable button 18-18" other than the one specifically provided for the respective manipulation situation or consciously selected is therefore reliably prevented.

One expedient feature of the method offers the possibility of generally deactivating the enable function of the enable button 18-18". In particular, an advantageous method feature may be provided as an option, whereby the inactive mode is assigned to every enable button 18-18" when the hand-operated device 9, 9' is switched on or when the supply voltage for the hand-operated device 9, 9' or safety switch device 16 is applied or activated. In addition or alternatively, the inactive mode is assigned to each of the enable buttons 18-18" after applying a common reset signal for the evaluation circuit 17 or the enable button 18-18", or after transmitting an initialisation command.

It may also be expedient if a timer is started when the operating mode of an enable button 18-18" is switched from the enable operation mode (Z) to the panic operating mode (P) or from the panic operating mode (P) to the enable operation mode (Z), and once a period predefined by this timer has elapsed, the inactive mode is assigned to this enable button 18-18" or the specific one of the enable buttons 18-18". This means that when there is a change or switch from the enable operation mode (Z) to the panic operating mode (P) or vice versa, a timer is started or restarted and the active mode is assigned to this enable button or each of the enable buttons within the period predefined by the timer. This feature ensues that detection of the second operating mode (ii), i.e. the panic operating mode (P), is regularly tested. As a result, even if hand-operated devices 9, 9' are switched on constantly, the last testing time of the panic operating mode (P) is no farther back in time than a specific maximum time and its function can be adequately assured before an enable signal can be output.

Based on one advantageous embodiment, once the operating mode of an enable button 18-18" has been switched from the panic operating mode (P) to the enable operation mode (Z) or from the panic operating mode (P) via the enable operation mode (Z) to the idle mode (0), a timer is started and signalling or the availability of an enabling mode is locked until its time has elapsed. This means that when an enable button 18-18" is switched from the panic operating mode (P) to the enable operation mode (Z) or from the panic operating mode (P) to the idle mode (0), a timer is started and signalling or the availability of an enabling mode is suppressed within a predefined period. Renewed enablement is therefore not possible during this predefined period. Even though one of the enable buttons 18-18" has been depressed in a panic situation and the system or technical device 1 halted, this feature prevents the enabling signal from being unintentionally emitted if it is then released and depressed again under certain circumstances and the technical device 1 is prevented from being unintentionally started up again.

Once the enabling mode has been started by the evaluation circuit 17, it may be of practical advantage if a timer is started and runs for a predefined period, and when this period has elapsed, the output or availability of the enabling mode is terminated. As a result of this feature, the enabling signal can only be activated continuously for a predefined, limited period. The prevents the enable button from being permanently set in an enabling position permitting manipulations, in which case its safety function would be lost.

In the case of one advantageous embodiment, before this predefined period elapses, a signalling element 24 is activated which has an optical, acoustic or tactile signalling effect on the user of the hand-operated device 9, 9'. The user is therefore informed in advance, e.g. on an acoustic, optical and/or tactile basis, that the period is about to elapse, so that when a machine is being operated, an undesired or inappropriate interruption to machine operation is prevented. In particular, the user can repeat or renew confirmation of the enable operation mode (Z) at a later time that is suitable for him. In other words, releasing the enable button 18-18" and operating it again will enable the operator to operate the machine at a time that is best for him.

Similarly, it may be that before the predefined time has elapsed, an input element 22 can be operated by the user of the hand-operated device 9, 9' in order to extend the predefined time or restart the timer.

The enable operation mode (Z) and the operating mode (P) of an enable button 18-18", preferably also the idle mode (0) of an enable button 18-18", are preferably detected by dual-circuit or multi-circuit redundant detection circuits 26, 26', 26" using sensors. The respective detection signals of the detection circuits 26-26" are then evaluated by the evaluation circuit 17 using two or more circuits. This means that an enabling mode is detected at the enable buttons 18-18" on the basis of two or more circuits or two or more channels by independently operating parts of the circuit and is fail-safe, in particular fail-safe based on one error, and two or more channels preferably transmit to the controllable technical device 1. This results in a fail safety system based on one fault, and even if a single fault occurs, the enable signal can still always be reliably cancelled. In particular, the technical device 1 and potentially dangerous machine operation is not actually enabled unless the detection circuits 26; 26'; 26" of an enable button 18-18" detect and signal enablement on a concurring basis.

The expression two or more circuits refers to the fact that each detection circuit 26, 26', 26" is provided two or more times. This being the case, a sensor-based detection circuit 26; 26'; 26" comprises a duplicated or multiple array of separate sensors, e.g. electrical contacts, a duplicated or multiple arrangement of separate signal transmission routes or wires, as well as a duplicated or multiple arrangement of separately operating partial detection or partial evaluation circuits which may be provided as part of the overall evaluation circuit 17, as schematically illustrated in in FIG. 3.

It is also of practical advantage if the active mode is not assigned by the evaluation circuit 17 unless the second operating mode (ii), i.e. panic operating mode (P), has been assumed by each of the redundant, sensor-based detection circuits 26-26" of the relevant enable button 18-18" and confirmed. It is also of advantage if a programming or so-called teach mode is not initiated or control elements 19 for emitting potentially dangerous control commands enabled by the evaluation circuit 17 unless the active mode has been assigned to at least one enable button 18-18". In particular, even in the event of an attempt to activate a programming or teach mode, the operator is signalled or reminded or prompted to the effect that it is necessary or expedient to activate at least one enable button 18-18".

As a matter of standard, the authorising or enabling signal is not applied to the controllable technical device 1 unless it has been detected that the operating mode of an enable button 18-18" has been switched from the idle mode (0) to the enable operation mode (Z) for each of the redundant sensor-based detection circuits 26-26". In other words, however many detection circuits 26-26" there are, they must all concur in their detection results in order for the enabling signal to be actually set.

Based on one advantageous embodiment, a display or information is output by means of a visually perceptible output device 23, for example by means of an optical signalling element 24 or by means of a screen 25 of the hand-operated device 9, 9' or by means of an optical lamp means on the enable button 18-18" or close to the enable button 18-18", indicating whether the active mode has been assigned to an enable button 18-18" and if necessary to which enable button 18-18" or which enable buttons 18-18". In particular, an operator of the hand-operated device 9, 9' is able to tell rapidly and unmistakably whether the active mode has been assigned to an enable button 18-18" and to which enable button 18-18" the active mode has been assigned.

Based on one advantageous embodiment, a signal or information is also output by means of a visually perceptible output device 23, for example by means of a touch-sensitive screen 25 of the hand-operated device 9, 9' or by means of an optical lamp means or signalling element 24 on the enable button 18-18" or close to the enable button 18-18" when an enable button 18-18" to which the inactive mode has been assigned has only been transferred to the first operating mode (i), i.e. has only been switched to the enable operating mode (Z). This means that if an enable button 18-18" that is inactive in principle, in other words an enable button 18-18" that is in the inactive mode, is switched to the enable operation mode (Z) by the operator even though these functions are being suppressed due to the prevailing inactive mode, the operator is informed of this fact accordingly. This avoids delays to the intended operation and avoids confusion about the absence of any action and optionally also further fruitless attempts at operation.

The special operating sequences, operating criteria and operating periods described above between the three enable button modes, namely idle mode (0), enable operation mode (Z) and panic operating mode (P), are preferably detected and monitored by the electronic evaluation circuit 17 and acted on or implemented accordingly. This is preferably handled by several independently operating detection and evaluation circuits and optionally involves a cross-comparison of the detected and derived operating and signal states, as schematically indicated in FIG. 3.

Another essential aspect is that the mobile hand-operated device 9, 9' is designed for technically and functionally implementing the described method features. To this end, the design is based on both appropriate switching technology, in particular for detecting and evaluating the operating mode on a multi-circuit sensor-based design and for practical purposes in particular, each detection circuit specifically comprises at least the detection circuits 26, 26', 26" for two or more independently operating and evaluating processors (CPUs) or programmable logic modules, as well as appropriate implementing means based on software and programming technology, as schematically illustrated in FIG. 3. In particular, the software-controlled control device 12 of the hand-operated device 9, 9' and its electronic evaluation circuit 17 can be programmed so that the corresponding method features and method sequences are run and implemented. Above all, the described status checks in conjunction with the respective operating sequences of the enable buttons 18-18" and the derived results and features are implemented by the evaluation circuit 17, in particular the safety switch device 16.

The embodiments illustrated as examples represent possible variants of the mobile hand-operated device 9, 9' and safety switch device 16 and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The objective underlying the independent inventive solutions may be found in the description.

Above all, the individual embodiments of the subject matter illustrated in FIGS. 1, 2, 3 constitute independent solutions proposed by the invention in their own right. The objectives and associated solutions proposed by the invention may be found in the detailed descriptions of these drawings.

List Of Reference Numbers

1 Device
2 Machine
3 Robot
4 Control unit
5 Control device
6 Control device
7 Control device
8 Control device
9, 9' Hand-operated device
10 Operator
11 Interface
12 Control device
13 Housing
14 Cable
15 Interface
16 Safety switch device
17 Evaluation circuit
18-18" Enable button
19 Control element
21 Emergency-off switching device
22 Input device
23 Input element
23 Output device
24 Signalling element
25 Screen
26 Detection circuit.

The invention claimed is:

1. A method of operating a mobile hand-operated device provided for outputting or enabling potentially dangerous control commands on a controllable technical device actively connected to the mobile hand-operated device or to another hand-operated device, in particular a robot or a machine tool, with a safety switch device comprising at least one evaluation circuit and at least one enable button connected to the at least one evaluation circuit for transmitting signals to the at least one evaluation circuit, the at least one enable button having an idle mode automatically assumed without operating force and having two consecutive operating modes set on a basis of at least one of differing strengths of operating force and different displacement distances, namely an enable operation mode and a panic operating mode, wherein in terms of control either a controllingly active mode or a controllingly inactive mode is electronically assigned to the at least one enable button, wherein in the controllingly active mode the at least one enable button can signal an enabling mode for running potentially dangerous control commands or assuming the enable operation mode allows an enabling mode to be made available, wherein in the controllingly inactive mode signalling or availability of the enabling mode is suppressed or not possible, wherein a check of the at least one enable button is run beforehand and the controllingly active mode is assigned to the at least one enable button when the at least one evaluation circuit has detected on a basis of signals from the at least one enable button that during the check that was run beforehand the panic operating mode has been assumed by the at least one enable button or that during the check that was run beforehand the panic operating mode and the idle mode have been assumed by the at least one enable button, and wherein a timer with a predefined sequence time is started when the at least one enable button assumes the panic operating mode or when the operating mode of the at least one enable button is switched from the panic operating mode to the enable operation mode or from the panic operating mode via the enable operation mode to the idle mode, and the signalling or availability of an enabling mode remains locked until it has elapsed.

2. The method as claimed in claim 1, wherein the controllingly active mode is not assigned until the panic operating mode has been detected a first time and a second time within a predefined period without the panic operating mode being detected in between the first time and the second time.

3. The method as claimed in claim 1, wherein the controllingly inactive mode is assigned to the at least one enable button after it has been switched to the panic operating mode and the controllingly active mode had already been assigned to it beforehand.

4. The method as claimed in claim 1, wherein the enabling mode is suppressed or cancelled if an enable button is placed in the panic operating mode irrespective of whether the controllingly active or controllingly inactive mode is prevailing at this enable button.

5. The method as claimed in claim 1, wherein the enabling mode is suppressed or cancelled if all the enable buttons to which the controllingly active mode has been assigned are in the non-operated idle mode.

6. The method as claimed in claim 1, wherein the enabling mode is suppressed or cancelled if the controllingly inactive mode has been assigned to every enable button.

7. The method as claimed in claim 1, wherein the controllingly inactive mode is assigned to every enable button after a supply voltage for the hand-operated device or for the safety switch device is switched on or after applying a common reset signal for the evaluation circuit or enable buttons or after transmitting an initialization command to the evaluation circuit.

8. The method as claimed in claim 1, wherein when the controllingly active mode is assigned to one enable button within a group of several enable buttons, the controllingly inactive mode is assigned to all the other enable buttons of this group.

9. The method as claimed in claim 1, wherein a timer is started when the operating mode of an enable button is switched from the enable operation mode to the panic operating mode or from the panic operating mode to the enable operation mode and when a period predefined by the timer has elapsed, the controllingly inactive mode is assigned to this enable button or to each of the enable buttons provided.

10. The method as claimed in claim 1, wherein a timer with a predefined time is started when the enabling mode is activated and signalling or availability of the enabling mode is terminated when this time has elapsed.

11. The method as claimed in claim 10, wherein before the predefined time elapses, a signalling element is activated which transmits an optical, acoustic and/or tactile signal effect to the user of the hand-operated device.

12. The method as claimed in claim 10, wherein before the predefined time elapses, the user of the hand-operated device can operate an input element to extend the predefined time or restart the timer.

13. The method as claimed in claim 1, wherein at least the enable operation mode and panic operating mode of an enable button and preferably also the idle mode of an enable button are detected by dual- or multi-circuit redundant, sensor-based detection circuits, the detection signals of the detection circuits are evaluated by the evaluation circuit on a dual- or multi-circuit basis and an enabling mode is detected on a dual- or multi-circuit basis or on a dual- or multi-channel basis and transmitted to a controllable technical device.

14. The method as claimed in claim 13, wherein the active mode is not assigned until it has been established that each one of the redundant sensor-based detection circuits has assumed the panic operating mode.

15. The method as claimed in claim 1, wherein a programming or a teach mode is not activated or control elements for emitting potentially dangerous control commands are not enabled until at least the controllingly active mode has been assigned to at least one enable button.

16. The method as claimed in claim 1, wherein a display or information is output via a visually perceptible output device indicating whether the controllingly active mode has been assigned to an enable button and optionally to which enable button.

17. The method as claimed in claim 1, wherein information or a signal is output via a visually perceptible output device if an enable button to which the controllingly inactive mode has been assigned is switched to the enable operation mode.

18. A mobile hand-operated device with a safety switch device for outputting or enabling potentially dangerous control commands to a controllable technical device actively connected to the mobile and-operated device or to another hand-operated device, in particular a robot or a machine tool, wherein the hand-operated device is designed to implement a method as claimed in claim 1.

19. A safety switch device comprising at least one evaluation circuit and at least one enable button connected to the evaluation circuit for transmitting signals to the at least one evaluation circuit and having an idle mode and two operating modes, which safety switch device is designed to enable potentially dangerous control commands to a controllable technical device actively connected to a mobile hand-operated device, in particular a robot or a machine tool, wherein the safety switch device is designed to implement a method as claimed in claim 1.

* * * * *